MAGNETIC PRINTING MACHINE

Filed April 9, 1956

3 Sheets-Sheet 1

INVENTOR.
WILLIAM J. RUEGER
BY [signature]
ATTORNEY

Jan. 21, 1958 W. J. RUEGER 2,820,956

MAGNETIC PRINTING MACHINE

Filed April 9, 1956 3 Sheets-Sheet 2

2,820,956
Patented Jan. 21, 1958

2,820,956

MAGNETIC PRINTING MACHINE

William J. Rueger, Pleasant Valley, N. Y., assignor to International Business Machines Corporation, New York, N. Y., a corporation of New York Application April 9, 1956, Serial No. 577,116

10 Claims. (Cl. 340—174)

This invention relates to magnetic printing and more particularly to an improved mechanism for forming character patterns on a magnetic surface.

In my copending application Serial No. 575,830, filed April 3, 1956, an improved coaxial magnetic head has been described in detail, and the subject application relates to a mechanism for utilizing such a magnetic head in the process of forming a character pattern on a magnetic surface.

Accordingly, it is a first object of this invention to provide an improved mechanism for forming characters on a magnetic surface.

It is a further object of this invention to provide a mechanism which is operative in response to the relative displacement of a magnetic head and magnetic surface for forming a character pattern on the magnetic surface.

It is a still further object of this invention to provide an improved mechanism for transferring characters from a storage medium to a magnetic surface.

It is a still further object of this invention to provide an improved mechanism for generating a character which is to be formed on a magnetic surface.

It is a still further object of this invention to provide an improved mechanism operative in response to the relative displacement of a magnetic head and magnetic surface for entering characters into a character generator.

It is a still further object of this invention to provide an improved decoding mechanism for changing character information from one code to another.

Other objects of the invention will be pointed out in the following description and claims and illustrated in the accompanying drawings, which disclose, by way of example, the principle of the invention and the best mode, which has been contemplated of applying that principle.

Briefly, this invention relates to a mechanism for use in conjunction with a multi-element magnetic head in a manner to effect character pattern formation on a magnetic surface. That is, as the head and magnetic surface are moved increment by increment relative to one another, selected ones of the multi-element head are energized at each increment of a character position to produce a pattern of magnetic spots on a magnetic material, such as a magnetic drum. This invention further contemplates the use of circuitry for changing the pattern for each character position that is to be magnetically formed.

Figure 1:
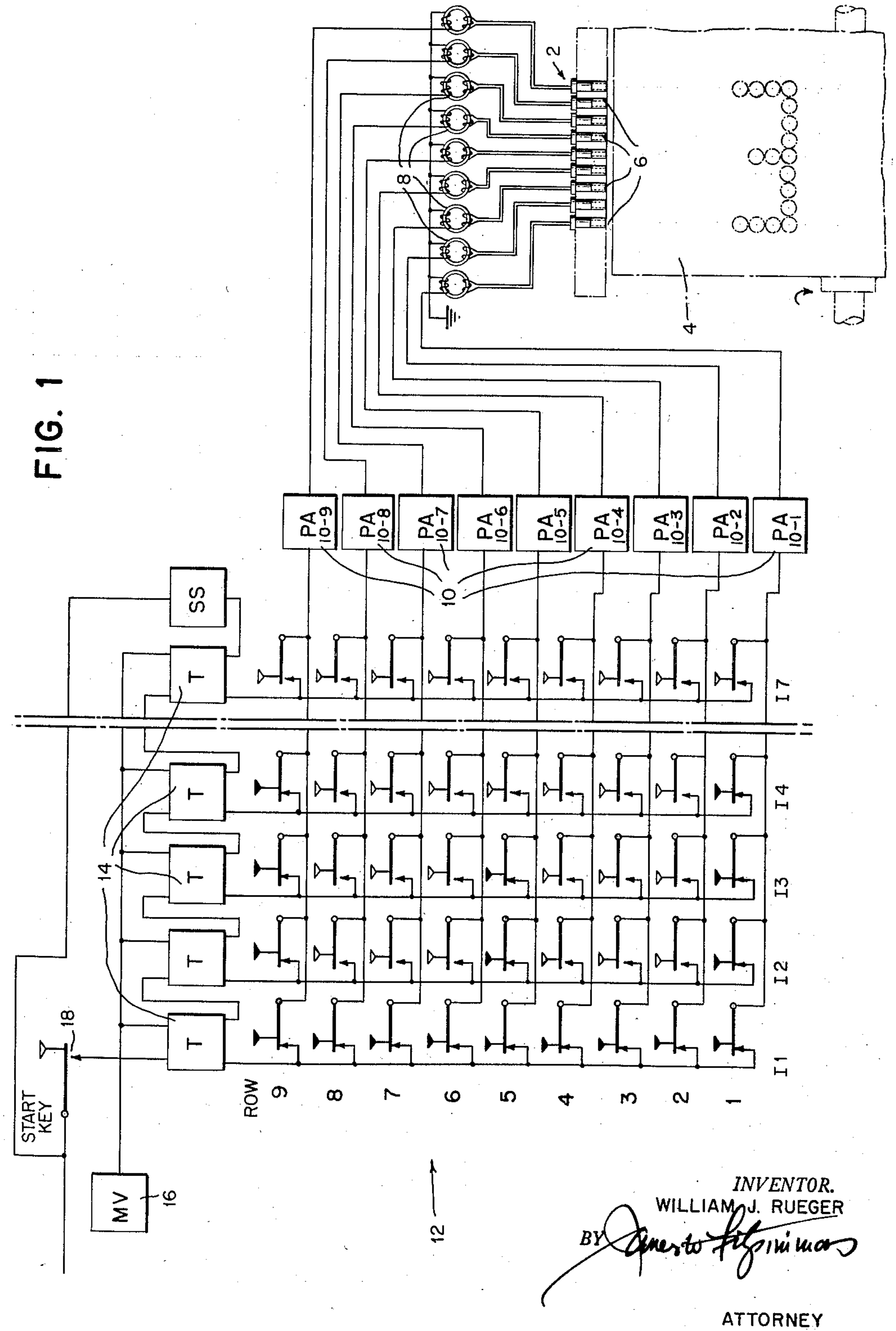
Fig. 1 is a diagrammatic representation of the mechanism for writing a character on a magnetic surface.

In the drawings, and particularly Fig. 1, a multi-element head 2, such as shown and completely described in copending application S. N. 575,830, is positioned operatively relative to a magnetic surface e. g. a magnetic drum 4. Conventional mechanism (not shown) is used to move the drum surface and multi-element head relative to one another, while elements of the head are energized, selectively. That is, as described in the above application, head 2 comprises a plurality of individual elements 6, each having circuitry, which when energized, causes the element 6 to produce a magnetic spot on a corresponding increment of the magnetic surface.

Each element 6 of the head 2 is electrically connected to an energizing coil 8 which in turn is connected to a respective power amplifier 10.

The power amplifiers 10 are shown connected to a switch array 12—many switches arranged in a network of individual horizontal rows, and vertical columns, each representing a character increment. A common point of all the switches in a row is connected respectively to one of the power amplifiers 10. The switches in the array 12—as shown in Fig. 1—have been set in the form of the character E as indicated by the black switch heads. To accomplish this, all the switches in increments I–1 are closed as well as switches in rows 1, 5, and 9 of increments I–2 and I–3; and switches in rows 1 and 9 of increment I–4.

This pattern formation provides a circuit to all of the power amplifiers 10 at increment I–1 time; power amplifiers 10—1; 10—5 and 10—9 at increment I–2 and I–3 time; and power amplifiers 10—1 and 10—9 at increment I–4 time.

Circuitry to fire the selected power amplifiers, and hence pulse the corresponding head elements 6 is completed through a plurality of triggers 14 which are connected, respectively, with each increment of the array 12. The triggers 14 are connected to a multivibrator 16 and start key 18 in a manner to form a stepping register wherein when the start key 18 is closed, the combination of the multivibrator and triggers will send a pulse (at increment I–1 time) through closed switches of increment I–1 of the array 12 to fire all of their power amplifiers 10, coils 8 and energize all the head elements 6. Then the trigger for increment I–1 is turned off while the trigger for increment I–2 is turned on whereupon a pulse is sent through the closed switches in rows 1, 5 and 9 of increment I–2 to fire the corresponding power amplifiers 10 and coils 8 and energize the corresponding head elements 6. This sequence will continue through increment I–4 to complete the formation of the predetermined character, and through the remaining increments of array 12 for purposes of spacing and the like, as later described.

*Specific mechanism for writing selected characters on a drum*

While the mechanism described above could be employed for writing one character at a time through the manual manipulation of the switches in array 12, it is obvious that such an arrangement would have little utility. Accordingly, in order to provide an operative machine it is necessary to establish control circuitry for changing the array pattern for each character position. Specifically, with reference to Fig. 2 of the drawing, a character generator 12 is in the form of magnetic cores. Each core is provided with a read-in, a read-out, and a sense winding. (The idea being to select all the cores in a particular pattern by pulsing the read-in winding.) Then as a pulse is sent through a read-out winding, the associated sense windings will be energized, while their cores will be reset. In the character array 12, a plurality of cores are employed individually for each character. The read-in windings of all the cores forming each individual character are connected in series. In the illustrated embodiment, circuitry later described is provided for pulsing individual character read-in circuits. That is, 64 different read-in line circuits are provided, each one of which is wound through a specific pattern of cores to form an individual character. Each of the characters in array 12 is formed by arranging cores in a plurality of horizontal rows and vertical columns which correspond to character position increments. Each sense winding (horizontal rows) is common to all the cores in a row, while the read-out windings (vertical rows) of each core are serially connected increment by increment. That is, at read-out 1 time all the cores in increment I–1′ are pulsed; at read-out 2 time all the cores in increment I–2′ are pulsed, etc. It follows that with the read-in circuit for the cores being arranged in a particular pattern, the sense windings which will be energized at each increment or read-out time, will form a particular combination of pulses in the sense windings, which as hereinafter explained, control the head elements to form increments of a character pattern on a drum surface.

Figure 2:
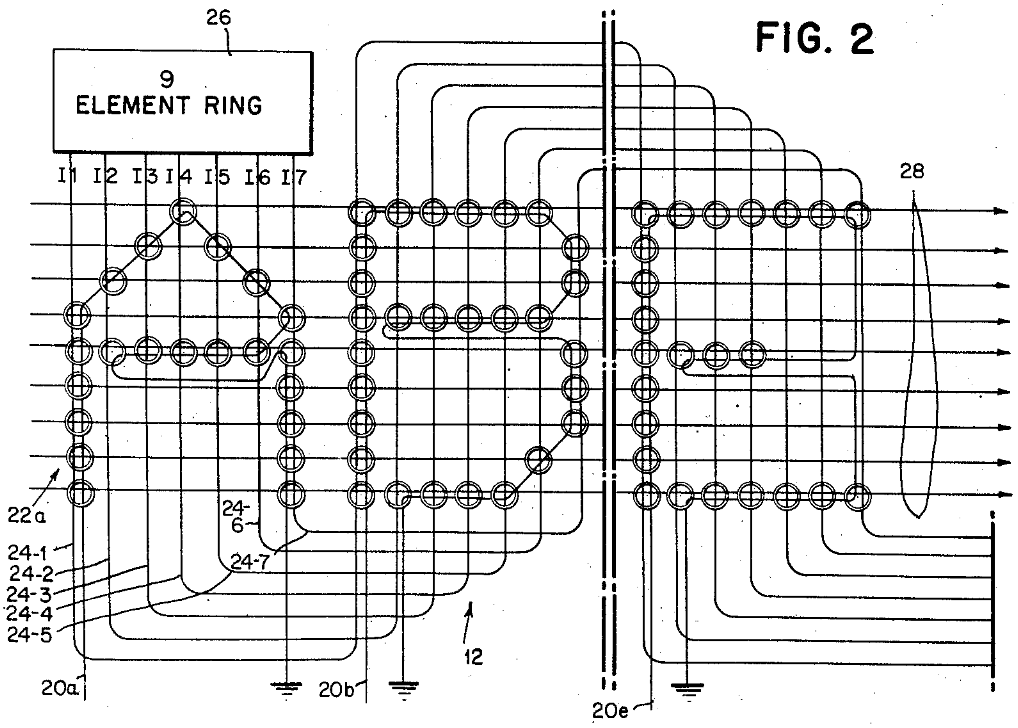
Fig. 2 is a diagrammatic view of a character generator core array.

To illustrate the arrangement of the cores, a read-in line 20–*a* is shown in Fig. 2 as passing through a plurality of cores 22–*a* arranged in the form of the character "A."

The read-out lines 24 are pulsed by a stepping register or ring 26 which can be any well known form, such as a Leslie ring, which is described in detail in "Proceedings of IRE," August 1948, "Leslie" Ring. The ring 26 is timed by a drum track, as later described and at increment I–1 time, of a character position, read-out line 24–1 which is connected to all the cores in increment I–1 of all the characters, is energized to reset selected cores, and thereby pulse the sense windings of all the cores that had been selected in increment I–1. At increment I–2 time, read-out line 24–2 is pulsed, etc.

Figure 3:
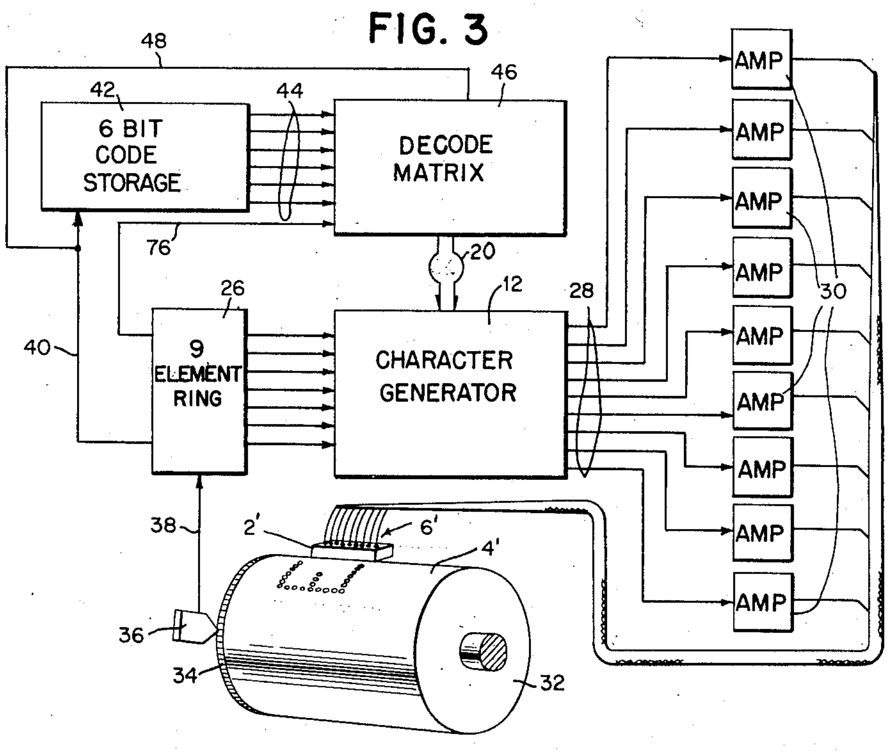
Fig. 3 is a diagrammatic view of the mechanism utilizing a core array for forming a character on a magnetic surface.

The sense lines 28 (with one for each individual row of character pattern) are connected respectively to associated power amplifiers 30 (Fig. 3). The power amplifiers 30, in turn, are cable connected to the individual elements 6′ of the magnetic head 2′.

With specific reference to Fig. 3, the drum surface 4′ is shown formed on a drum 32 which is moved relative to head 2′ by some external power means (not shown). In the specific embodiment, drum surface 4′ is marked with a "sync" track 34 which is divided into bits corresponding to the number of increments in the character positions. A read head 36 of any conventional form is positioned to be impulsed each time a "sync" bit 34 passes under it, thereby generating a pulse in the line 38. Each pulse in the line 38 is used to control a stepping register or nine element ring 26 which pulses character increment positions in sequence by energizing the corresponding read-out lines in a character array. For convenience, each character position on the drum is divided into 9 bits, of which 7 are for writing, and 2 are for spacing. Accordingly, bits 1–7 of each character position are used to energize the read-out lines in the character array, while bits 8 and 9 are provided for suitable inter-character spacing on the magnetic surface, while the pulses are used for character transfer. Furthermore, a pulse generated by step 1 of the nine element ring 26 is sent through line 40 to signal a storage reading mechanism 42 designated six bit code storage, to transmit a coded character via the cable 44 into a decode matrix 46. A parallel line 48 is provided off line 40 to operate the decode matrix, as later described.

The code storage reader 42, while not described, could have many well known forms, of which one could be a magnetic tape reading mechanism. Actually, any medium for providing some combination of pulses in the cable 44 upon instruction would suffice. The cable 44 has six lines for a 6 bit standard binary code which is used to represent individual characters. This six bit code is translated, as later described, in the decode matrix to provide a pulse at a selected one of the read-in lines 20—which as heretofore mentioned, will when energized, read in or select all the cores in its particular character pattern. This core character pattern, under control of the stepping ring 26, is read out to impulse the amplifier 30 to energize the corresponding head elements 6′ to form the selected character increment by increment.

*Decode matrix*

The decode matrix 46 (Fig. 4) comprises six horizontal rows of cores, each including a code core 52–1; 52–2; 52–4; 52–8; 52–0; and 52–X, respectively. In each of the rows there is a predetermined number of magnetic cores 52 arranged in Christmas tree fashion so that there are sixty-four cores in row 52–X; thirty-two in row 52–0; sixteen in row 52–8; eight in row 52–4; four in row 52–2 and two in row 52–1. It will be understood that an individual line from each of the sixty-four cores in row 52–X (a sense coil with respect to cores in row 52–X such as indicated at 20*a*), forms the read-in line for the character pattern in character generator array 12.

The decode matrix 46 is further (Fig. 4) provided with a core stepping register 56 which functions as a read-out source, sending a read-out pulse to each of the rows of cores, seriatim. That is, a multivibrator 58 emits a stepping pulse cyclically which passes simultaneously through all of the cores 60 of the core stepping register 56, and for convenience, this cyclic pulse will be designated the stepping pulse.

The circuitry is such that when a coded read-in common pulse is available from the ring 26 through the line 48, as described with respect to Fig. 3, a read-in pulse is available to select the core 60–*s*, which is one of the cores forming the core stepping register 56. Thus, when the multivibrator 58 emits its next stepping pulse, the core 60–*s* will be read out to set up a pulse in the sense, or delay line 62–1. The purpose of the delay line is, as the name implies, a device for delaying the time for selecting the next core 60–1. The delay line is equipped with a diode 64, a coil or inductance 66, and a capacitor 68 chosen simply to permit the decay of the last pulse generated in the cores by the multivibrator 58, before the delay line operates to select the next core in a descending order. At the next stepping pulse, core 60–1 will be reset and pulses will be induced simultaneously in the sense windings 70–1 and delay line 62–2. (It will be recognized that the pulse in the delay line 62–2 will be used to select the core 60–2 before the next stepping pulse; and then, in turn, core 60–4 will be selected in time for the next stepping pulse, etc.) It follows that each stepping pulse will in turn cause the sense windings 70–1; 70–2; 70–4, etc., to be pulsed, seriatim. With this circuitry, it can be appreciated that each time a pulse is applied to line 48, the stepping register 56 will be sent through a complete cycle to pulse the sense lines 70–1 through 70–X in sequence.

As heretofore described, the generation of the pulses in the line 48 is concurrent with a pulse through the line 40 which is used to trigger the six bit code storage box 42 to send pulses through the cable 44 to some preselected number of the code cores 52–1 through 52–X. In a specific example, the character "A" is composed of the 1, 0, and X bits, and it follows therefore, that for the character "A" the code cores 52–1, 52–0 and 52–X will be selected.

Before describing the sequence of events resulting from the selection of the above mentioned code cores in combination with the sequential pulsing of the lines 70–1 through 70–X, it is to be explained that the line 70–1 is so connected to the cores 52–1–2; the core 52–1–1; and the core 52–1, that a pulse through the line 70–1 will simultaneously attempt to select the core 52–1–2; half select the core 52–1–1; and read out the core 52–1.

With this set of facts, it will be recognized that upon the pulsing of line 70–1, then the following will take place: The pulse in line 70–1 attempts to select core 52–1–2 and half select the core 52–1–1, but since it also resets the core 52–1, which has been selected, the sense winding 72–1 will be pulsed, and this winding is, when pulsed, arranged to half select core 52–1–1 and inhibit the selection of core 52–1–2. The half selection of core 52–1–1 is additive to the half selection that was supplied by line 70–1, and therefore, the core 52–1–1 will be selected, while the core 52–1–2 will not be selected. Since core 52–1–2 has not been selected, none of the cores in the right half of the Christmas tree making up the decode matrix will be operative during this complete cycle of the stepping register 56 for the character "A."

At the time that the line 70–2 is pulsed, it reads out the cores 52–1–2, 52–1–1, and 52–2; however, since there is nothing in the core 52–1–2 there will be no read-out, but the core 52–1–1 will be read out thereby setting up a pulse in the line 74–1–1, which when pulsed, is arranged to half select the core 52–2–1 and select the core 52–2–2. Since core 52–2 has not been selected, a pulse is not available in the sense line 72–2 (each of the 72 lines like sense line 72–1 is arranged to half select and inhibit alternate cores) and therefore, core 52–2–1 will be only half selected, while core 52–2–2 will be selected.

When a pulse is available in line 70–4 it will read out all of its associated cores in line 52–2 and code core 52–4. However, only core 52–2–2 has been selected, and therefore a pulse will be induced in its transfer line 74–2–2, which in turn, half selects the core 52–4–3 and selects the core 52–4–4.

At 70–8 time, the pulse through core 52–4–4 will induce current flow in its transfer line 74–4–4 (which will half select core 52–8–7 and select core 52–8–8) and concurrently read out the core 52–8, but since this core has not been selected, the sense line 72–8 will not be pulsed and therefore, core 52–8–8 will be selected.

Then, when a pulse is available in the line 70–0, it will read out the core 52–8–8 to induce a current flow in its transfer line 74–8–8 (which will half select core 50–0–15 and try to select core 52–0–16) and concurrently it will read out the core 52–0, which has been selected. Therefore, a pulse will be generated in the sense line 72–0 and accordingly, the selection of core 52–0–16 will be inhibited while the half select in core 52–0–15 caused by the transfer line 74–8–8, and the half select caused by the sense line 72–0 will combine to select the core 52–0–15.

When a pulse is available in line 70–X it will read out the core 52–0–15 and generate a pulse in the transfer line 74–0–15 (which half selects core 52–X–29 and tries to select core 52–X–30) and concurrently read out the core 52–X which has been selected and thereby generate a pulse in the sense line 72–X. The pulse in sense line 72–X will add to the half select of the transfer line 74–0–15 and the core 52–X–29 will be selected.

Figure 4:
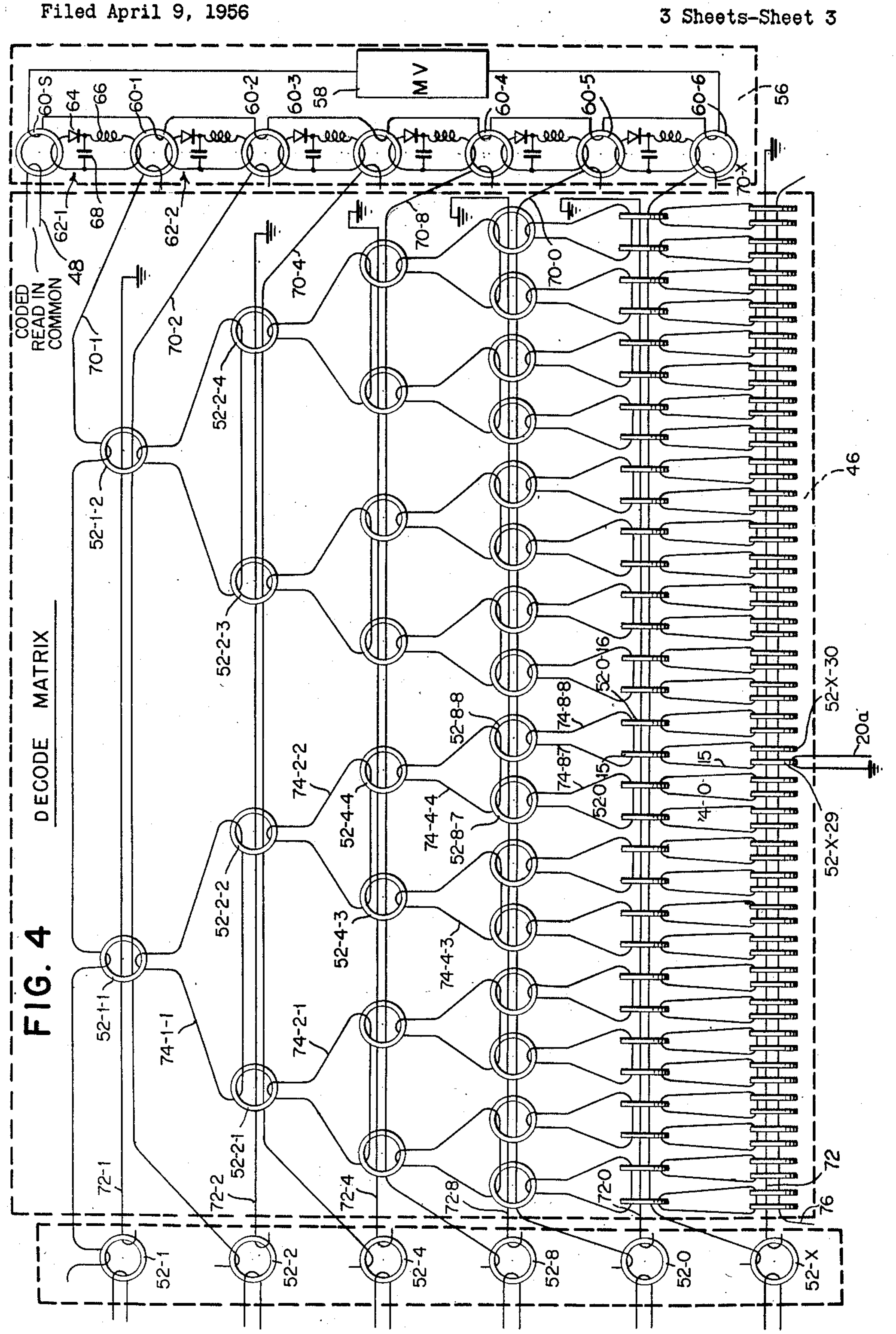
Fig. 4 is a schematic diagram of a core decoding mechanism which is used to translate character information from one code to another.

With reference again to Fig. 3, it is represented that a pulse at eight time (increment 1–8 of a character position) from the stepping register 26 is sent through line 76 into the decode matrix. The pulsing of line 76, as shown in Fig. 4, acts to read out any one of the cores in row 52–X that has been selected. With the facts described, the pulse in line 76 will act to read out the core 52–X–29 thereby inducing current in the sense line 20–*a*, which is the read-in line for the character "A" in the character generator array 12 (shown in detail in Fig. 2).

With the mechanism and circuitry shown, it can be appreciated that a character may be decoded in the matrix 46 at the same time that a character is being formed on the drum surface 4′.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A mechanism for forming a character pattern on a moving magnetic surface comprising in combination a magnetic head having a plurality of individual juxtapositioned head elements which are operable to form a character pattern when selectively energized during alignment of the head with the plural increments of a character position on said magnetic surface, a character generator having electrical subdivisions corresponding in number to the number of increments of a character position on said magnetic surface, each of said electrical subdivisions having individual selectively conditionable means corresponding in number to the number of said magnetic head elements, means conditioning said conditionable means to form a pattern corresponding to the characters to be formed on said magnetic surface, means responsive to the alignment of increments of a character position with said magnetic head for pulsing the corresponding electrical subdivision of the character generator, and means responsive to the pulsing of said electrical subdivisions for energizing said head elements corresponding to the conditioned conditionable means in each pulsed electrical subdivision.

2. A mechanism for forming a character pattern on a moving magnetic surface comprising in combination a magnetic head having a plurality of individual juxtapositioned head elements which are operable to form a character pattern when selectively energized during alignment of the head with the plural increments of a character position on said magnetic surface, a character generator having electrical subdivisions corresponding in number to the number of increments of a character position on said magnetic surface, each of said electrical subdivisions having individual selectively conditionable means corresponding in number to the number of said magnetic head elements, means conditioning said conditionable means to form a pattern corresponding to the characters to be formed on said magnetic surface, a timing track on said magnetic surface, means conditioned by said timing track for emitting an impulse as each increment of a character position is in alignment with said magnetic head, means responsive to said impulses for energizing said electrical subdivisions of the character generator seriatim as said head elements are in alignment with a corresponding character subdivision position on said magnetic surface, and means responsive to the energization of said conditionable means in each electrical subdivision for energizing the corresponding head elements of said magnetic head.

3. A mechanism for forming a character pattern on a moving magnetic surface comprising in combination a magnetic head having a plurality of aligned individual juxtapositioned head elements, said head elements being selectively energizable when in alignment with subdivisions of a character position on said moving magnetic surface to form a magnetic character pattern, a character generator having electrical subdivisions corresponding in number to the subdivisions of a character position on said magnetic surface with each electrical subdivision having individual selectively conditionable means corresponding in number to the number of head elements of said magnetic head, a timing track on said magnetic surface subdivided to correspond to the subdivisions of a character position, means operable in conjunction with the timing track to electrically energize each electrical subdivision of the character generator as the corresponding subdivision of the character position is in alignment with said magnetic head, input means for selectively conditioning said conditionable means in said character generator to form a predetermined character pattern and means responsive to the pulsing of said conditionable means as each electrical subdivision of the character generator is pulsed via said timing track for energizing the corresponding head elements of said magnetic head thereby forming a character pattern on said magnetic surface corresponding to the character pattern in said character generator.

4. A mechanism for forming a character pattern on a moving magnetic surface comprising in combination a magnetic head having a plurality of aligned individual juxtapositioned head elements, said head elements being selectively energizable when in alignment with subdivisions of a character position on said moving magnetic surface to form a magnetic character pattern, a character generator having electrical subdivisions corresponding in number to the subdivisions of a character position on said magnetic surface with each electrical subdivision having individual selectively conditionable means corresponding in number to the number of head elements of said magnetic head, a timing track on said magnetic surface subdivided to correspond to the subdivisions of a character position, means operable in conjunction with the timing track to electrically energize each electrical subdivision of the character generator as the corresponding subdivision of the character position is in alignment with said magnetic head, input means for selectively conditioning said conditionable means in said character generator to form a predetermined character pattern and means responsive to the pulsing of said conditionable means as each electrical subdivision of the character generator is pulsed via said timing track for energizing the corresponding head elements of said magnetic head thereby forming a character pattern on said magnetic surface corresponding to the character pattern in said character generator, said conditionable means being unconditioned as each electrical subdivision of the character generator is pulsed whereby said character generator is ready to be conditioned for the next character position.

5. A mechanism for forming a character pattern on a moving magnetic surface comprising in combination a magnetic head having a plurality of aligned individual juxtapositioned head elements, said head elements being selectively energizable when in alignment with subdivision of a character position on said moving magnetic surface to form a magnetic character pattern, a character generator having electrical subdivisions corresponding in number to the subdivisions of a character position on said magnetic surface with each electrical subdivision having individual selectively conditionable means corresponding in number to the number of head elements of said magnetic head, a timing track on said magnetic surface subdivided to correspond to the subdivisions of a character position, means operable in conjunction with the timing track to electrically energize each electrical subdivision of the character generator as the corresponding subdivision of the character position is in alignment with said magnetic head, input means for selectively conditioning said conditionable means in said character generator to form a predetermined character pattern, means controlled by said timing track for operating said input means when a predetermined subdivision of a character position is in alignment with said magnetic head, and means responsive to the pulsing of said conditionable means as each electrical subdivision of the character generator is pulsed via said timing track for energizing the corresponding head elements of said magnetic head thereby forming a character pattern on said magnetic surface corresponding to the character pattern in said character generator.

6. A mechanism for forming a character pattern on a moving magnetic surface comprising in combination a magnetic head having a plurality of individual juxtapositioned head elements selectively energizable during relative alignment of said head with subdivisions of a character position, a timing track on said magnetic surface divided into bits corresponding to the subdivisions of the character position, means responsive to predetermined ones of said timing track bits passing a reference position for energizing selective ones of said head elements thereby forming a character pattern subdivision by subdivision on said magnetic surface.

7. A mechanism for forming a character pattern on a moving magnetic surface comprising in combination a magnetic head having a plurality of individual juxtapositioned head elements selectively energizable during relative alignment of said head with subdivisions of a character position, a timing track on said magnetic surface divided into bits corresponding to the subdivisions of the character position, a predetermined electrical pattern having electrical subdivisions corresponding to the subdivisions of the character position and means responsive to a bit on said timing track passing a reference position for conditioning said electrical pattern to condition selected ones of said head elements at a character subdivision position corresponding to the electrical subdivision of the pattern.

8. A mechanism for forming a character pattern on a moving magnetic surface comprising in combination a magnetic head having a plurality of individual juxtapositioned head elements selectively energizable as said head is aligned with a subdivision of a character position, a timing track having bits corresponding in number to the subdivisions of the character positions on said magnetic surface, a character generator having electrical subdivisions corresponding to the number of subdivisions in the character position with each electrical subdivision being further subdivided into individual conditionable means corresponding in number to the head elements of said magnetic head, means responsive to the energization of said conditionable means for energizing corresponding ones of said head element, means responsive to predetermined ones of said bits passing said reference position for conditioning said conditionable means to form an electrical pattern in said character generator, and means responsive to other bits on said timing track for energizing the electrical subdivisions of said character generator and consequently energizing said head elements whereby a character pattern is formed on said magnetic surface.

9. A mechanism for forming a character pattern on a moving magnetic surface comprising in combination a magnetic head having a plurality of individual juxtapositioned head elements selectively energizable as said head is aligned with a subdivision of a character position, a timing track having bits corresponding in number to the subdivisions of the character positions on said magnetic surface, a character generator having electrical subdivisions corresponding to the number of subdivisions in the character position with each electrical subdivision being further subdivided into individual conditionable means corresponding in number to the head elements of said magnetic head, means responsive to the energization of said conditionable means for energizing corresponding ones of said head elements, means responsive to predetermined ones of said bits passing said reference position for conditioning said conditionable means to form an electrical pattern in said character generator, means responsive to other bits on said timing track for energizing the electrical subdivisions of said character generator and consequently energizing said head elements whereby a character pattern is formed on said magnetic surface, and means responsive to the energization of each electrical subdivision of said character generator for unconditioning said individual conditioning means thereby preparing said character generator for the reception of the next character.

10. A character generator as defined in claim 2 comprising a plurality of cores arranged in electrical subdivisions which in turn are divided into elements corresponding in number to the individual head elements of said magnetic head, a read-in winding wound through selective ones of said cores and including means for selecting the cores through which it is wound when said read-in winding is pulsed, a read-out winding passing through all the cores in an electrical subdivision of said character generator in a manner to read out all the cores that have been selected by said read-in winding in that electrical subdivision, sense windings passing through each core in a common element of all the subdivisions of said generator, means responsive to the pulsing of said sense winding for energizing the corresponding one of said head elements of said magnetic head of claim 2, and means conditioned by the timing track of claim 2 for energizing a read-out line thereby energizing selected ones of said head elements at a character position subdivision.

No reference cited.